H. B. HARTMAN.
METHOD OF PURIFYING WATER ELECTROLYTICALLY.
APPLICATION FILED MAY 22, 1909.
951,311.
Patented Mar. 8, 1910.
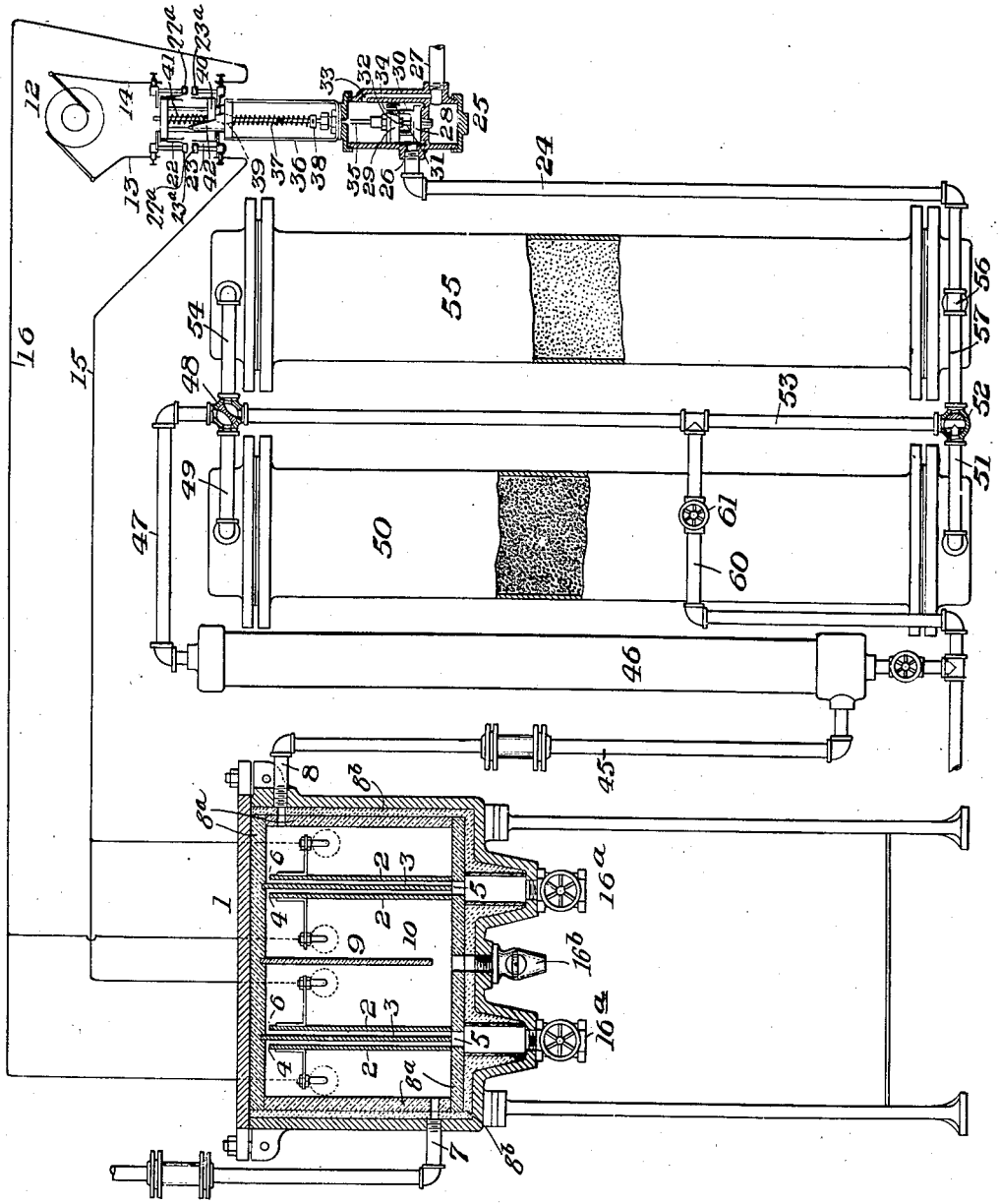
Witnesses.
Inventor:
Harry B. Hartman
By Fredk W. Winter
Attorney

UNITED STATES PATENT OFFICE.

HARRY B. HARTMAN, OF PITTSBURG, PENNSYLVANIA, ASSIGNOR TO McDOWELL MANUFACTURING COMPANY, OF PITTSBURG, PENNSYLVANIA, A CORPORATION OF PENNSYLVANIA.

METHOD OF PURIFYING WATER ELECTROLYTICALLY.

951,311.   Specification of Letters Patent.   Patented Mar. 8, 1910.

Application filed May 22, 1909. Serial No. 497,729.

*To all whom it may concern:*

Be it known that I, HARRY B. HARTMAN, a resident of Pittsburg, in the county of Allegheny and State of Pennsylvania, have invented a new and useful Improvement in Methods of Purifying Water Electrolytically, (Case 2,) of which the following is a specification.

This invention relates to the method of purifying water and other liquids electrolytically in which the liquid is subjected to the action of an electric current flowing alternately and equally between metallic electrode plates, and in which the ozone or oxygen and other gases and salts generated by the current act on the organic impurities contained in the liquid.

The object of the invention is to provide a method of the kind named in which the liquid is thoroughly purified and in an economical manner.

The essential features of the method consist in making and breaking the electric circuit to the electrode plates with the starting and stopping of flow of the liquid, but in a manner to maintain the circuit somewhat longer than the flow of liquid so as to insure the full treatment of all parts of the liquid; in subjecting the liquid to several successive treatments of the electric current and between the same mixing the water and holding it with the confined gases and salts for such period of time as to enable the gases to act upon the organic matters contained in the water; in the use of an alternating current, or a current periodically reversed to flow alternately and equally in opposite directions, in conjunction with electrodes of aluminium or an alloy or composition containing aluminium, which under the action of the electric current give off aluminium oxy-hydrate and on account of the reversals of the current remain clean; in mechanically filtering the liquid so treated electrolytically in order to separate therefrom the coagulum and flocculent precipitates; and in other process steps hereinafter described and claimed.

The accompanying drawing shows a sectional diagram of apparatus suitable for carrying out the invention.

1 illustrates the electrode box in which the liquid is subjected to the action of an electric current. This box is shown as provided with a plurality of sets of electrode plates, each set being shown as consisting of three plates, namely the outside plates 2 and an intermediate plate 3, said plates being so arranged that the liquid enters at the upper end of one outside plate, as at 4, thence flows downwardly between said plate and the intermediate plate, underneath the latter, as at 5, thence up between said intermediate plate and the other outside plate and over the top of the latter, as at 6. The inlet to the electrode box is at 7 and the outlet is at 8 on the opposite side or end and at the top, so that the box is always full of liquid and the plates entirely covered. The plates are so set in the box that the liquid cannot escape around the edges, but is compelled to take the course indicated. The plates are set in the lining $8^a$ which is separated from the iron box by the insulation $8^b$. Between the two sets of electrodes is a space 9 of very materially greater cross-sectional area than the spaces between the electrode plates so that the liquid passes through the same at a very much reduced rate of flow in order that the gas and salts generated between the plates have time to act upon the impurities in the liquid, and particularly to permit the oxygen or ozone generated to coagulate the organic matters in the liquid. This space may be termed a reaction or coagulation chamber. The box is tightly sealed in order that the gases cannot escape, but are confined in the liquid. In order to mix the liquid and gases in this space it is divided by means of plate 10 projecting from the top downwardly toward the bottom so as to compel the liquid to flow down underneath the same and thence up to the second group of plates. The box shown is provided with two groups or sets of electrode plates and a single intermediate mixing space, but obviously any desired number of groups of plates may be provided, and any desired odd number of plates may be used in each group.

The particular box illustrated is similar to that shown, described and claimed in my application filed concurrently herewith, Serial No. 497,732, but the present method is not limited to the use of this specific box, it being sufficient to provide any form of sealed box having therein a plurality of sets of electrodes in order to give successive treatments to the liquid, with intervening mixing or reaction spaces.

The electrode plates are formed of aluminium or of an aluminium alloy or composition, which under the action of the electric current gives off oxy-hydrate of aluminium which is insoluble in water and forms a flocculent precipitate with the impurities in the water. In conjunction with such aluminium containing plates I use either an alternating current, or at least a periodically reversing current such as described in my application Serial No. 418,745, filed March 2, 1908, which current is reversed in a manner to cause the current to flow alternately in opposite directions for equal or uniform periods of time during the flow of the liquid. In the present instance there is illustrated a source of alternating current, such as the alternating generator shown at 12 which is connected by mains 13 and 14 to connections 15 and 16 respectively to the outside plates 2 of each group of electrode plates. No electrical connection is made to the intermediate plate or plates of each group, but the latter in each instance become bi-polar. The current flowing alternately and equally in opposite directions between the plates keeps the plates clean, the deposit which forms thereon being merely soft and slushy so that it sloughs off from time to time. Consequently the plates at all times develop their maximum efficiency and develop a large percentage of aluminium oxy-hydrate. The plates, of course, can be cleaned from time to time and for this purpose flushing outlets closed by valves 16$^a$ are provided in the bottom of the electrode box underneath each set of electrodes, and another flushing outlet closed by valve 16$^b$ is provided in the bottom of the reaction and coagulation chamber 9.

In order to economize in current the circuit to the electrode box is made and broken with the starting and stopping of flow of the liquid through the apparatus, and this is effected in a manner to maintain the current flow somewhat longer than the liquid flow. Various forms of apparatus to effect this purpose may be used. As shown in the drawings this circuit interrupter is arranged to break both sides of the circuit between relatively stationary metal contacts 22 and carbon contacts 22$^a$ and movable metal contacts 23 and carbon contacts 23$^a$. The carbon contacts 22$^a$ are slidably mounted in their holders so as to permit the circuit to be made and broken between the carbon contacts before it is made and broken between the metal contacts, thereby overcoming the evil effects of arcing. The movable contacts are connected to means whereby the circuit is closed upon the beginning of flow of liquid through the purifying apparatus, but slightly before such flow begins, and is broken by the interruption of liquid flow but somewhat later than the cessation of such flow, in order to insure the proper electrical treatment of all liquid flowing through the electrode box. The particular mechanism for effecting such making and breaking of the circuit which is illustrated in the drawings is similar to that shown and described in my application filed concurrently herewith, Serial No. 497,730, and is as follows: In the service pipe 24 is a valve casing 25 having an inlet 26 and outlet 27 with a valve 28 normally closing communication between the inlet and outlet. In the upper part of the casing is a piston 29 provided with a yoke 30 having a sliding fit on stem 31 of the valve. Said stem at its upper end is provided with a nut or head 32 which limits the amount of idle or lost-motion movement which the piston may have upwardly without lifting the valve 28 from its seat. The chamber above the piston is connected by relief passage 33 with the outlet side of the casing and the piston is also provided with a small equalizing port 34. Connected to the piston is a rod 35 projecting up through a stuffing box in the upper end of the casing and through the upper end of a bracket 36. This rod and the piston are normally held depressed by a helical compression spring 37 surrounding the rod between the bracket 36 and an adjustable collar 38 secured to said rod. Secured to the rod 35 above the bracket is a cone-shaped body 39 which in the upward movement of the rod contacts with and carries with said rod the cross-head 40 carrying the movable contacts 23 and which cross-head is slidably mounted on said rod. A helical compression spring 41 is put under compression when the cross-head moves upwardly. When fully elevated the cross-head is locked in position to hold the current closed by means of trigger 42 which is held by a suitable spring in engagement with said cross-head and which is provided with a projecting portion in position to be engaged by the cone-shaped body 39 as the latter approaches the limit of its downward movement. The operation of this circuit maker and breaker is as follows: When the service pipe is closed and no water is flowing through the apparatus the valve 28 is seated, the piston 29 is in its lowest position and the circuit is broken. As soon as the service pipe is opened the pressure above the piston 29 is instantly relieved through passage 33 and consequently said piston is forced upwardly. This carries the cross-head 40 upwardly and closes the circuit between the terminals 22 and 23. These terminals contact before the lost-motion between the piston yoke 30 and valve stem head 32 is entirely taken up. The further upward movement of piston 29 brings the yoke 30 into contact with the head 32 of the valve stem and lifts said valve, thus permitting water to flow through the casing. The circuit, however, was closed between the terminals 22 and 23 before the valve 28 was opened, one set of said terminals being mounted to slide to allow for the further movement of the piston 29 and cross-head 40 after the terminals contact. As soon as the service pipe is closed the pressure backs up through relief passage 33 above the piston 29 and brings said piston down quite sharply until the valve 28 seats. The closing of valve 28 cuts off communication between the supply side of the casing and the passage 33 so that further equalization cannot take place through said relief passage 33, and the subsequent equalization to permit the piston to come fully down must take place through the small leak port 34. This is so small that the piston descends further slowly under the action of spring 37. Meanwhile the cross-head 40 remains in elevated position by trigger 42 for a considerable period of time after the valve 28 is seated and until the piston 29 approaches the limit of its downward movement, when the cone 39 contacts with the projecting portion of the trigger and releases the same from the cross-head. This permits spring 41 to snap the cross-head downwardly and break the circuit.

The circuit controller described operates entirely automatically to make and break the circuit by the turning on and off the water or other liquid being purified, but in such a manner that the current through the electrode box is established before any liquid begins to flow through the same, and the breaking of the circuit is retarded for some time after the liquid ceases to flow through the electrode box. Consequently it is not possible for any liquid to escape treatment by the electric current for an adequate period of time to destroy all of the organic matter therein.

From the electrode box the liquid passes through pipe 45 to the lower end of a vertical reaction and ozoning chamber 46 through which it rises and thence passes by pipe 47 to a four-way valve 48 which normally is set to direct the water through pipe 49 to the upper end of a mechanical filter 50. To the lower end of said filter is connected a pipe 51 leading to three-way valve 52 which normally directs the liquid to vertical pipe 53 also connected to the four-way valve 48 and the latter being connected by pipe 54 to the upper end of the mechanical filter 55. The lower end of the latter filter is connected to a tee 56 to which is connected a pipe 57 leading to the three-way valve 52, and the service pipe 24 is also connected to said tee. A flushing pipe 60 provided with valve 61 is connected to pipe 53. The filters 50 and 55 may be of any desired kind of mechanical filters. Preferably the filter 50 will be filled with fine quartz or sand and the filter 55 with charcoal or the like. In the normal position of the four-way valve 48 and three-way valve 52 as shown the liquid is conducted through filters 50 and 55 in succession flowing downwardly through each filter. By changing the position of the three-way valve 52 and opening the flushing valve 61 the liquid from the lower end of filter 50 passes through the three-way valve 52 and pipe 57 to the lower end of filter 55 and upwardly through the latter and then through pipe 54, four-way valve 48 and pipes 53 and 60 to the flushing outlet, it being understood that the service spigots are meantime closed. By reversing the four-way valve 48 and changing the position of the three-way valve 52, as above, the liquid coming through pipe 47 passes downwardly through filter 55 and thence by pipe 57 through the three-way valve 52 through pipe 51 into the lower end of filter 50, thence upwardly through the latter and by pipe 49 to four-way valve 48 and thence through pipes 53 and 60 to the flushing outlet. In this manner each of the filters can be separately washed by clean liquid coming through the other filter.

The method described provides for the complete and thorough purification of the liquid with a minimum of electric current, but in a manner to insure all portions of the liquid being acted upon by said current. Actual use of the method shows that it destroys or removes from water practically all of the germs and organic matter without rendering the water insipid or unpleasant to the taste.

What I claim is:

1. The method of purifying liquids consisting in causing the liquid to flow between metallic electrodes and there subjecting the same to the action of an electric current, and making and breaking the electric circuit when starting and stopping the flow of the liquid and in a manner to maintain the current flow appreciably longer than the liquid flow.

2. The method of purifying liquids consisting in causing the liquid to flow between metallic electrodes and there subjecting the same to the action of an electric current flowing alternately and equally in opposite directions, and making and breaking the electric circuit when starting and stopping the flow of the liquid and in a manner to maintain the current flow appreciably longer than the liquid flow.

3. The method of purifying liquids consisting in causing the liquid to flow between metallic electrodes and there subjecting the same to the action of an electric current, making the circuit when starting the liquid flow, and breaking the circuit when stopping the liquid flow but slightly later than the latter.

4. The method of purifying liquids consisting in causing the liquid to flow between metallic electrodes and there subjecting the same to the action of an electric current flowing alternately in opposite directions, making the electric circuit when starting the liquid flow, and breaking the circuit when stopping the liquid flow, but slightly later than the latter.

5. The method of purifying liquids consisting in causing the liquid to flow between metallic electrodes and there subjecting the same to the action of an alternating electric current, and making and breaking the electric circuit when starting and stopping the flow of the liquid and in a manner to maintain the current flow appreciably longer than the liquid flow.

6. The method of purifying liquids consisting in causing the liquid to flow between metallic electrodes and there subjecting the same to the action of an alternating electric current, making the electric circuit when starting the liquid flow, and breaking the circuit when stopping the liquid flow but later than the latter.

7. The method of purifying liquids consisting in causing the liquid to flow between electrodes containing aluminium and there subjecting the same to the action of an electric current, and making and breaking the electric circuit when starting and stopping the flow of liquid and in a manner to maintain the current flow appreciably longer than the liquid flow.

8. The method of purifying liquids consisting in causing the liquid to flow between electrodes containing aluminium and there subjecting the same to the action of an alternating electric current, and making and breaking the electric circuit when starting and stopping the flow of liquid and in a manner to maintain the current flow appreciably longer than the liquid flow.

In testimony whereof, I have hereunto set my hand.

HARRY B. HARTMAN.

Witnesses:
HOWARD NEELY,
F. W. WINTER.